(12) United States Patent
Hodgson-Stokx et al.

(10) Patent No.: US 10,899,104 B2
(45) Date of Patent: Jan. 26, 2021

(54) METHOD FOR MANUFACTURING A REGISTERED EMBOSSED DECORATIVE PANEL

(71) Applicant: TRESPA INTERNATIONAL B.V. [NL/NL], Weert (NL)

(72) Inventors: Marcelle Hodgson-Stokx, Weert (NL); Henricus Hubertus Maria Kömhoff, Weert (NL); Stefan Henri Dominique Maria Symkens, Weert (NL)

(73) Assignee: Trespa International B.V.

( * ) Notice: Subject to any disclaimer, the term of this patent is extended or adjusted under 35 U.S.C. 154(b) by 224 days.

(21) Appl. No.: 16/070,829

(22) PCT Filed: Jan. 18, 2017

(86) PCT No.: PCT/NL2017/050027
§ 371 (c)(1),
(2) Date: Jul. 18, 2018

(87) PCT Pub. No.: WO2017/135810
PCT Pub. Date: Aug. 10, 2017

(65) Prior Publication Data
US 2019/0022971 A1    Jan. 24, 2019

(30) Foreign Application Priority Data

Feb. 3, 2016 (NL) .................................... 2016215

(51) Int. Cl.
*B29C 43/02* (2006.01)
*B32B 3/30* (2006.01)
(Continued)

(52) U.S. Cl.
CPC ................ *B32B 3/30* (2013.01); *B29C 43/02* (2013.01); *B29C 43/18* (2013.01); *B32B 5/022* (2013.01); *B32B 5/024* (2013.01); *B32B 7/04* (2013.01); *B32B 7/06* (2013.01); *B32B 21/06* (2013.01); *B32B 21/08* (2013.01); *B32B 21/14* (2013.01); *B32B 23/06* (2013.01); *B32B 23/08* (2013.01);
(Continued)

(58) Field of Classification Search
None
See application file for complete search history.

(56) References Cited

U.S. PATENT DOCUMENTS

| 3,280,735 | A | * | 10/1966 | Clark | ................ B41M 5/38235 101/470 |
| 3,373,068 | A | | 3/1968 | Grosheim et al. | |

(Continued)

FOREIGN PATENT DOCUMENTS

JP    56133123    * 10/1981

OTHER PUBLICATIONS

International Search Report for International Application No. PCT/NL2017/050027 dated Apr. 18, 2017.

*Primary Examiner* — Edmund H Lee
(74) *Attorney, Agent, or Firm* — Suiter Swantz pc llo

(57) ABSTRACT

A method for manufacturing a registered embossed decorative panel including providing a substrate having a printed design, applying a coating to the surface of the substrate, applying a release foil to the coating, curing the coating to maintaining the position of the release foil, printing a resin on the release foil, consolidating the composite under heat and pressure, and removing the release foil.

10 Claims, 2 Drawing Sheets

(51) Int. Cl.
  *B32B 38/06* (2006.01)
  *B32B 38/10* (2006.01)
  *B32B 38/00* (2006.01)
  *B44C 1/24* (2006.01)
  *B44C 5/04* (2006.01)
  *B32B 21/14* (2006.01)
  *B32B 23/08* (2006.01)
  *B32B 27/40* (2006.01)
  *B32B 27/10* (2006.01)
  *B32B 21/08* (2006.01)
  *B32B 23/06* (2006.01)
  *B32B 29/02* (2006.01)
  *B32B 21/06* (2006.01)
  *B32B 29/00* (2006.01)
  *B32B 7/04* (2019.01)
  *B32B 7/06* (2019.01)
  *B32B 27/30* (2006.01)
  *B32B 5/02* (2006.01)
  *B32B 37/02* (2006.01)
  *B32B 27/36* (2006.01)
  *B29C 43/18* (2006.01)
  *B32B 37/06* (2006.01)
  *B32B 37/10* (2006.01)

(52) U.S. Cl.
  CPC .............. *B32B 27/10* (2013.01); *B32B 27/30* (2013.01); *B32B 27/36* (2013.01); *B32B 27/40* (2013.01); *B32B 29/005* (2013.01); *B32B 29/02* (2013.01); *B32B 37/02* (2013.01); *B32B 37/06* (2013.01); *B32B 37/10* (2013.01); *B32B 38/0036* (2013.01); *B32B 38/06* (2013.01); *B32B 38/10* (2013.01); *B32B 38/145* (2013.01); *B44C 1/24* (2013.01); *B44C 5/04* (2013.01); *B32B 2250/02* (2013.01); *B32B 2255/08* (2013.01); *B32B 2255/12* (2013.01); *B32B 2255/26* (2013.01); *B32B 2262/02* (2013.01); *B32B 2262/062* (2013.01); *B32B 2262/067* (2013.01); *B32B 2262/101* (2013.01); *B32B 2262/106* (2013.01); *B32B 2262/14* (2013.01); *B32B 2264/025* (2013.01); *B32B 2264/0257* (2013.01); *B32B 2264/10* (2013.01); *B32B 2264/108* (2013.01); *B32B 2270/00* (2013.01); *B32B 2307/306* (2013.01); *B32B 2307/406* (2013.01); *B32B 2307/408* (2013.01); *B32B 2307/4023* (2013.01); *B32B 2307/546* (2013.01); *B32B 2307/7265* (2013.01); *B32B 2307/748* (2013.01); *B32B 2419/00* (2013.01); *B32B 2439/40* (2013.01); *B32B 2451/00* (2013.01); *B32B 2553/00* (2013.01); *B32B 2597/00* (2013.01); *B32B 2605/08* (2013.01); *B32B 2605/12* (2013.01); *B32B 2605/18* (2013.01); *B32B 2607/00* (2013.01)

(56) References Cited

U.S. PATENT DOCUMENTS

| | | | |
|---|---|---|---|
| 3,802,947 A | | 4/1974 | McQuade, Jr. |
| 3,814,647 A | * | 6/1974 | Scher et al. ............ B44C 3/085 |
| | | | 156/219 |
| 3,823,046 A | * | 7/1974 | Yamagishi ................ B44F 1/06 |
| | | | 156/220 |
| 3,962,009 A | * | 6/1976 | Minanni ................. B32B 27/00 |
| | | | 156/85 |
| 4,092,199 A | * | 5/1978 | Ungar ................... B44C 5/0469 |
| | | | 156/222 |
| 4,093,766 A | * | 6/1978 | Scher ...................... B32B 27/04 |
| | | | 428/165 |
| 4,396,448 A | * | 8/1983 | Ohta ....................... B32B 27/04 |
| | | | 156/219 |
| 5,296,340 A | * | 3/1994 | Tsukada ................. B32B 27/08 |
| | | | 430/394 |
| 2006/0130421 A1 | * | 6/2006 | Nollet ....................... B44C 5/04 |
| | | | 52/582.1 |
| 2014/0023832 A1 | | 1/2014 | Pervan et al. |

* cited by examiner

METHOD FOR MANUFACTURING A REGISTERED EMBOSSED DECORATIVE PANEL

TECHNICAL FIELD AND BACKGROUND

The present invention relates to a method for manufacturing a registered embossed decorative panel. The present invention furthermore relates to a registered embossed decorative panel obtainable according such a method.

Registered embossed decorative panels are known in the art. For example U.S. Pat. No. 3,802,947 relates to a method of producing a high pressure laminate having registered colour and embossing by a transfer operation. The method of producing a decorative laminate, having aligned or registered embossing and colour on its decorative side, employs a temporary transfer laminate of an overlay on a separator sheet which transfers embossing, overlay and colour to the high pressure laminate during its production. Upon a molding plate there is assembled in a stack from the bottom up, a cushion sheet, a release sheet, a melamine resin impregnated overlay sheet wherein the melamine resin is cured, and an embossed separator sheet or embossed molding plate GB 2 088 280 relates to a process for preparing an embossed thermoset decorative laminate comprising forming a stack comprising: (i) a core layer, comprising one, or a plurality of, thermosetable phenolic resin impregnated paper sheets; (ii) a decorative layer comprising a pre embossed noble resin impregnated decorative paper sheet; and optionally, (iii) either a wear surface layer conforming in contours to the pre-embossed noble resin impregnated decorative paper sheet and comprising a noble resin composition which is at least partially thermoset; or a wear surface layer comprising an overlay impregnated with a noble thermosetable resin composition; forming an assembly comprising: (i) said stack, and (ii) a deformable thermoplastic or elastomeric press-pad adjacent said decorative sheet or wear surface layer; applying heat and pressure to the assembly so as to cause the said press-pad to conform to said pre-embossed paper sheet and to consolidate the stack to form a unitary structure and to convert the thermosetable resins to the thermoset state; removing said deformable pad to provide an embossed thermoset decorative laminate, the contours of the decorative surface of which conform substantially to those of the pre-embossed noble resin impregnated decorative paper sheet.

WO 03/006232 relates to a method of fabricating a product, comprising: locating a resin soaked sheet having a decorative motif on a board; placing the resin soaked sheet and board into a press machine having a press plate with a three dimensional surface; and curing the resin at a predetermined temperature while pressing the resin soaked sheet and board with the press plate at a predetermined pressure such that a laminated product is produced; wherein the produced laminated product has a surface texture that is embossed in registration with the decorative motif.

WO 80/02531 relates to a method for producing a heat and pressure consolidated laminate which comprises consolidating an assembly under heat and pressure wherein said assembly consists essentially of, in superimposed relationship: (i) a core layer, said core layer consisting of a self-supporting substrate impregnated with a phenol-formaldehyde condensation product, (ii) an undecorated kraft paper sheet impregnated with a colourless, first thermosetting resin, (iii) a surface coating, said surface coating consisting of a pigmented, second thermosetting resin, and (iv) an embossing press plate having a surface with protuberant and valley areas capable of being impressed into the uppermost surface of said kraft paper sheet and means for preventing the embossing press plate from sticking to the kraft paper sheet during lamination; said consolidating thereby effecting a lamination of said assembly together, an embossment of the uppermost of the kraft paper sheet and a migration of the pigmented, second thermosetting resin from the areas of said embossment corresponding to the protuberant areas of the embossed press plates to the valley areas thereof and thereafter removing said embossing press plate from the resultant laminate so as to produce a dense laminate having embossed areas of contrasting colour.

U.S. 2014/023832 relates to a method of forming an embossed surface on a building panel, comprising the steps of: providing a an aluminium or plastic foil, forming an ink matrix having a horizontal and vertical extension by applying a curable ink on an upper part of the foil by means of a digital ink head; forming a cavity in a surface layer of the building panel by pressing a lower part of the foil and the ink matrix located on the upper part of the foil against the surface layer of the building panel, thereby forming an embossed surface of the building panel, and removing the foil with the ink matrix from the embossed surface. The surface layer comprises a decorative layer with a print, wherein the cavity is in register with the print.

In U.S. 2014/023832 the alignment between the printed design and embossing print is carried out by two major methods by digital printing of the embossing print. The first method is the printing of the embossing ink directly on the printed and resinated paper substrate or printed resin/filler matrix or on printed thermoplastic layer substrate which is subsequently removed after the press-cycle from the embossed surface. According to this method there is no use of a separate carrier film/paper/substrate for the embossing print and the embossing print needs to have perfect release properties towards the surface resins/polymers of the final panel. The second method applies a carrier film/paper/substrate for the embossing print having release properties towards the surfaces resins/polymers of the final product. According to this such an embossing print, being on its carrier, is put together with the printed design, in alignment, during the press process itself. An aspect of this process is that both process steps, namely the print-cycle of the embossing print on the film and the press-cycle of the complete stack, need to be matched to one another.

U.S. Pat. No. 3,373,068 relates to a process for producing a decorative laminate with an embossed surface comprising preparing an assembly in superimposed relationship of a plurality of thermosetting phenolic resin impregnated core sheets, a decorative sheet positioned immediately above said core sheets and impregnated with a noble thermosetting resin which is not subject to significant darkening upon the application of heat, a release sheet positioned above said decorative sheet carrying on the side of said release sheet away from said decorative sheet a raised printed design providing increased thickness in the printed area wherein the raised printed design has substantially no tendency to deform under the subsequently applied laminating conditions, thereupon heat and pressure consolidating the assembly to a unitary structure and removing the release sheet carrying the raised printed design.

According to U.S. Pat. No. 3,373,068 the creation of the printed design and the embossing print are done in two separate process steps. This is done without any alignment between the printing steps during their manufacturing, wherein only similar or the same printing decors are used to give an as good as possible match between the printed design and the embossing print. The alignment is done by putting both the printed design and the printed embossing sheet as good as possible onto one another in the press. Due to such complicated processes during printing of the embossing ink/resin with a lack of sufficient control over all parameters (expansion and shrinkage of substrates in both printing steps) exact alignment is made even more difficult. The desired optical and physical properties of the final, embossed surface are obtained by using melamine- or urea- or polyester resins as noble resins on top of the printed design which need to flow well under the heat and pressure during the press cycle.

U.S. 2014/335216 relates to a method of manufacturing a web-shaped matrix for the production of surface materials, particularly surfaces during the production of laminate panels, wherein a structured surface is provided with a flexible carrier web layer made of paper or film and a layer separating from the surface material arranged on the side of the surface material, wherein the structured surface is configured in the carrier web layer made completely from paper and arranged on the side of the separating layer facing away from the surface material.

An aspect of the method disclosed in U.S. 2014/335216 concerns the use of a web shaped matrix with the structure giving coating on one side and the release coating on the other side, as a separate product. This composite is subsequently put together with a resinated decorative layer, followed by positioning it in the press for curing the resins and forming a structured surface thereby making the method of registered embossing complex and difficult.

BRIEF SUMMARY

An object of the present invention is to provide a method for manufacturing a registered embossed decorative panel wherein it is not necessary to use special papers, décor prints, press-plates and paper impregnation stations all adapted to one another.

Another object of the present invention is to provide a method for manufacturing a registered embossed decorative panel by using printing techniques on release films.

Another object of the present invention is to provide a method for manufacturing a registered embossed decorative panel wherein matt and gloss effects between valley and top of an embossed pressed panel can be realized in an easy way.

The present invention thus relates to a method for manufacturing a registered embossed decorative panel, said method comprising the following steps:
  i) providing a substrate having a printed design,
  ii) applying a coating on the surface of the substrate provided with printing,
  iii) applying a release foil on the coating provided according to step ii),
  iv) curing said coating and thereby positioning said release foil on said substrate and maintaining said position,
  v) printing a resin on the release foil provided in step iii), wherein the resin thus applied is in register with the printed design of the substrate according to step i),
  vi) consolidating the composite according to step v) under heat and pressure,
  vii) removing the release foil from the composite thus consolidated according to step vi).

On basis of the present method the present inventors found that if relief prints, i.e. according to step v), are applied on top of the release foil of the coated substrate, i.e. décor, and then put in a press, the print put on top of release foil will create valleys in the coating of the substrate which is located on the other side of the release foil. The present inventors thus found that the printing process can be carried out separately from the panel pressing process. According to present step iv) the release foil is secured onto the substrate. The presence of the coating provides a bonding between the coating and the substrate on the one hand, and a bonding between the coating and the release foil on the other hand. Such a type of bonding can be seen as a mechanical bonding since the release foil has to be easily released in step vii).

The location of the coating between the substrate and the release foil and the function of the coating provides an exact positioning of the two layers with respect to each other, i.e. the substrate and the release foil. In other words, a possible movement in the x-y direction, namely in a plane parallel to both layers, is prevented. This way of a obtaining a fixed positioning of the two layers, i.e. the substrate and the release foil, before any of steps v)-vii) is carried out, is an important aspect of the present invention. Due to the exact and fixed position of the release layer with respect to the substrate layer step v) can be carried out in such a way that the resin printed on the release foil is in register with the printed design of the substrate according to step i). And the register construction thus obtained can be easily maintained during the following steps vi)-vii) resulting in a registered embossed laminate/panel. And the mechanical bonding between the substrate and the release foil as discussed above facilitates step vii).

According to the present method the resin printed on top of the release foil and the coating present on the substrate are not allowed to flow under the conditions of pressure and temperature of the press cycle as applied in step vi). This provision is needed in view of the creation of the present type of embossing effect. The present inventors found that the height of the resin printed on the release foil will define the depth of the valley in the coating of the substrate. Please note that the resin printed on the release foil is not a part of the final product, since the release foil including the printed resin is removed after the press-cycle. In order to prevent a flow of resin printed on top of the release foil and the coating present on the substrate it is necessary to apply curing stages in the present method.

In addition, the print on top of the release foil is not in contact with the coating on the décor, this coating can be easily adapted to be overcoatable by its chemistry or curing stage. This is very advantageous for coating the tops of the final panel obtained after step vii). Such a coating step may comprise the application of a final coating layer with different gloss-level and/or colour.

As an example of a press to be used in the present method a press as used in HPL (High Pressure Laminates), CPL (Continuous Pressure Laminates) and DPL (Direct Press Laminate) processes can be mentioned In the present method for manufacturing a registered embossed decorative panel it is preferred that said coating applied in step ii) is pre-cured according to step iv) before step v) is carried out. The present inventors found that such a step of pre-curing has a beneficial effect on positioning the release foil on the décor, especially with regard to step of v). By pre-curing the coating applied on the substrate having a printed design the printed design is "embedded" in the pre-cured coating and the risk of movement of the print on the release foil, now in register with the printed design on the substrate, is secured during handling. Thus the intended alignment of the prints on both the décor and the release foil is achieved. The term pre-cure refers to a situation wherein the coating is not fully cured, also identified as a partial cure.

In a situation of fully curing the curable components no additional steps after leaving the press are necessary for curing the coating.

Another benefit of pre-curing the coating is that the application of a matt finish later on in the present method is more effective, i.e. a better adhesion of that matt finish on the coating. This is especially useful for applying a coating after the press cycle, i.e. the adhesion between the coating applied before the press cycle (applied in step ii)) and the coating applied after the press cycle (applied in step viii)).

In addition, the present inventors found that when the release foil with the print on top is removed from the coated décor after the press-cycle, it is possible to overcoat the tops of the embossed surface with another coating layer thereby creating matt/gloss effects between valley and top of the embossed pressed panel. Thus, it is preferred the method for manufacturing a registered embossed decorative panel further comprises a step viii) of coating specific areas of the outer surface of the registered embossed decorative panel obtained after step vii). Examples of said specific areas comprise the top areas of the outer surface.

In a preferred embodiment the release foil according to step iii) is transparent. By providing this release foil as a transparent or translucent film there is no need to apply register marks on the opposite side of the release foil.

As discussed above the substrate having a printed design and the release foil are maintained in alignment during step v) and vi). This aspect will be further explained in the experiments section of this application.

According to step v) the printing is carried out with curable resins. Curing is a term that refers to the toughening or hardening of a polymer material by cross-linking of polymer chains, brought about by radiation (EB curing, UV curing), heat (thermal curing) and chemical additives, or a combination thereof.

According to another preferred embodiment the printing according step v) is carried as a digital printing technique. An advantage of this lies in the fact that the printing process on top of the release foil, creating the registered embossing, can be done in a separate stage, completely disconnected from all other process steps. Especially if digital printing is used, based on UV-curing inks/resins, as printing process for the print on top of the release paper/film, the registering of this print to the already existing décor can be done easily via scanning methods. Either scanning of register markings on the coated décor or scanning of the complete décor is possible. This printing technique also allows applying in both multipass and single pass, multi head, very accurately, very significant amounts of printing resin. Furthermore these printed inks/resins withstand the press conditions very well without losing their rigidly, creating the valleys in the underlying coating/resin of the décor. The present method may thus further comprises a step of scanning the printed design and storing the printed design thus scanned as a digital file, wherein the digital file thus created is used for printing the resin on the release foil according to step v).

The present invention also relates to a composite, comprising a substrate having a printed design, a coating provided on the surface of the substrate having a printed design and a release foil provided on the coating, wherein the position of the release foil with respect to the substrate is fixed by said coating.

In a preferred embodiment of such a composite the release foil is provided with a print, wherein the print of said release foil is in register with the printed design on the substrate.

In an embodiment the coating located between the release foil and the substrate is pre-cured.

According to the present invention it is thus possible that present steps i)-iv) and v) can be carried out by company A and that present steps vi)-vii) are carried out by company B. Thus the printing steps can be carried separately from the panel processing steps. The composite obtained according to steps i)-iv) or i)-v) can be stored and at later stage further processed in a pressing process for manufacturing a final panel. When using radiation curable resins for printing, e.g. digital printing in step v), a curing step is applied, for example with UV/EB radiation, during the printing process. Such a curing step provides a good fixation of the applied ink/resin on the release foil and this aspect has benefits for further handling of the materials. The products thus obtained are so-called "tack free" and can thus be stored as rolls or sheets for further processing.

In the present method for manufacturing a registered embossed decorative panel step vi) is preferably carried out with simultaneous application of a temperature from 100 to 250° C. at a pressure of 15 to 100 kg/cm$^2$ for 10 seconds up to 1 hour. The combination of pressure, temperature and time are chosen such that a permanent deformation of the surface structure is realized. In fact, the actual parameters depend on the build-up of the panel or laminate. For example, in an embodiment of a PVC panel the panel can be heated up to 60° C. and only a few bar of pressure with a roll-laminator during only a split-second in touch with the décor is sufficient in the manufacturing process.

The present invention furthermore relates to a registered embossed decorative panel obtainable according to the method as discussed above.

According to a preferred embodiment the present method for manufacturing a registered embossed decorative panel, comprising the following steps, namely step 1: printing a substrate with the desired design, step 2: coat/resinate the printed substrate and apply during the coating process the release film/paper and curing the composite consisting of substrate having a printed design, a coating and a release foil, step 3: printing of the embossing print, in register with the décor below, on top of the release foil before entering the press-cycle, step 4: put the roll/sheet of the above printed and resinated/coated décor of step 3 into an appropriate press-cycle, step 5: remove the printed release paper/film from the pressed, registered embossed, coated/resinated laminate/panel, and an optional step 6: coat the tops of the registered embossed laminate/panel, without touching the valleys of the embossing, creating gloss/matt effects between the already in-register top-valley of the pressed décor. By attaching the coated printed substrate layer firmly to the release film, before the step of printing the structure giving layer, i.e. step 3, the present inventors found that registered embossings can be easily obtained. In case of using curable resins for printing the embossing print an additional step of curing these resins is carried out before entering the press cycle.

The above discussed panel may further comprise a core layer on which the present registered embossed decorative panel is positioned. Such a core layer may comprise a thermo pressed stack of resin impregnated papers, for example phenol resin impregnated papers. According to another embodiment non-wovens and wovens of wood fibres, glass fibres, textile fibres, synthetic fibres, carbon fibres, or a mixture thereof, can be used to partly or completely replace the paper in the resin impregnated stack. In yet another embodiment the resin impregnated paper can be replaced by a prepreg. Such a prepreg or a densified fibre mat can be considered as a consolidated core of a fibre containing material comprised of wood or cellulose fibres which are coated with a thermosetting synthetic resin. The thickness of prepregs may be considerable larger than a typical paper, and may include thicknesses >1 cm, or even greater.

In a specific embodiment such a panel can be used in exterior walls and facades.

BRIEF DESCRIPTION OF THE DRAWINGS

The present invention also relates to the use of such a panel in interior and/or exterior decoration.

Further advantages, features and details of the invention result from the following description of preferred exemplary embodiments and also using the description. All the drawings shown here are a schematic presentation and are only intended for interpretation of the description and claims.

In the figures:

FIG. 1 shows a front view of a coated and printed substrate with a release film on top of the coating of the printed substrate.

FIG. 2 shows a front view of a registered embossing print on top of release film.

FIG. 3 shows a front view of a press-cycle.

FIG. 4 shows a front view of a panel after press-cycle and optional coating of tops.

DETAILED DESCRIPTION

A method for manufacturing a registered embossed decorative panel including providing a substrate having a printed design, applying a coating to the surface of the substrate, applying a release foil to the coating, curing the coating to maintaining the position of the release foil, printing a resin on the release foil, consolidating the composite under heat and pressure, and removing the release foil.

Figure 1:
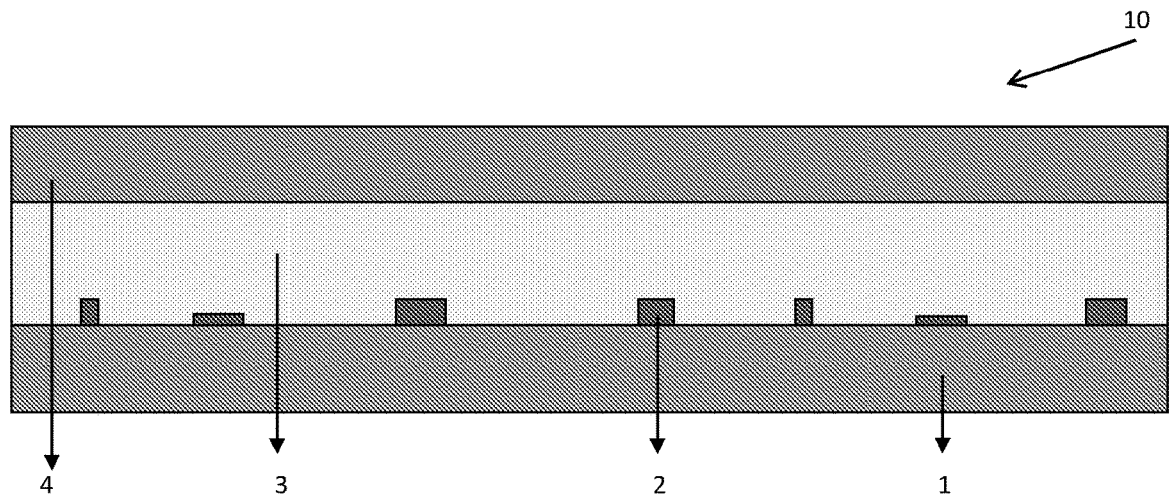

FIG. 1 shows a front view of a coated and printed substrate 10 with a release film 4 on top of a coating 3. Coating 3 is located on substrate 1, wherein substrate 1 is provided with a desired design 2. Design 2 is completely covered by coating 3 and a release film 4 is placed on coating 4. This FIG. 1 shows thus the result of the above mentioned steps 1 and 2.

Figure 2:
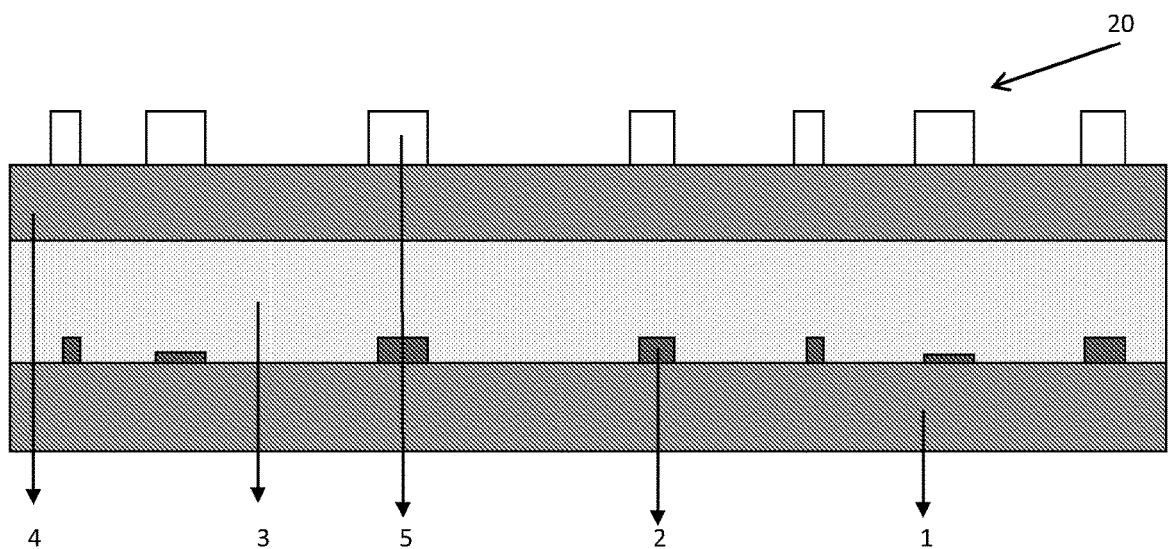

According to FIG. 2 the coated and printed substrate 10 as shown in FIG. 1 is provided with the embossing print 5 resulting in a composite 20. In composite 20 the embossing print 5 is printed in register with the décor below, i.e. the design or print 2 present on substrate 1. This FIG. 2 shows thus the result of the above mentioned step 3.

Figure 3:
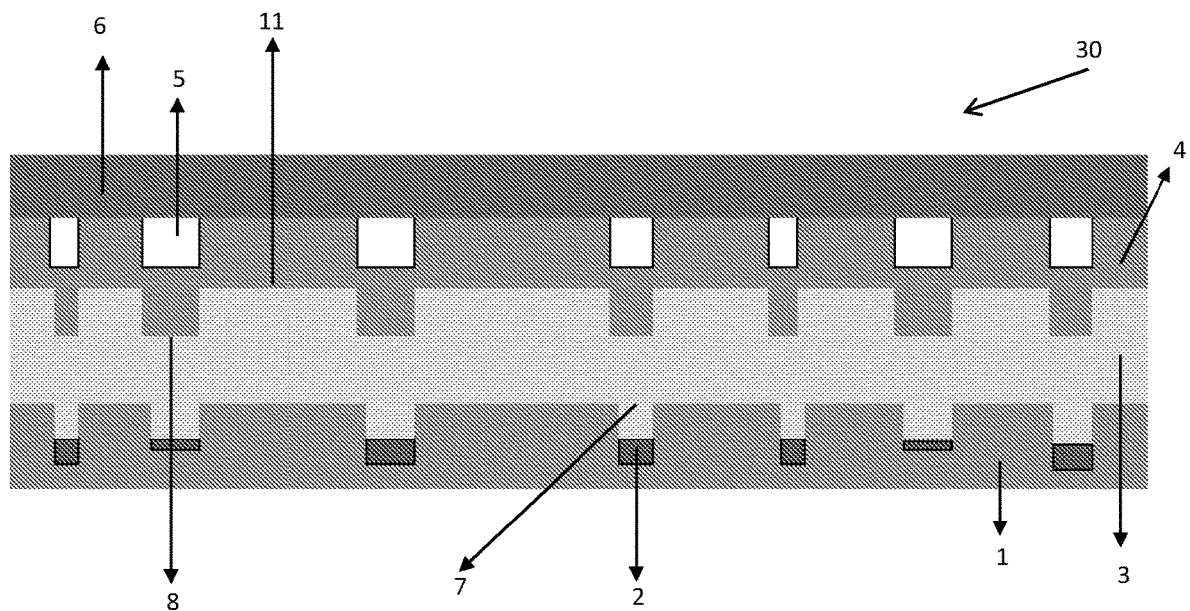

According to FIG. 3 a press plate 6 is brought into contact with release film 4 and the embossing print 5 is pressed into the release film 4 resulting in a displacement of the embossing print 5. The displacement of the embossing print 5 is into the direction of the design 2 present on substrate 1. Since the embossing print 5 is printed in register with the design or print 2 present on substrate 1, the design or print 2 will be pressed into the substrate 1. The result is that on the interface between the substrate 1 and the coating 3 trenches or indentations 7 will be created, the trenches 7 being filled with coating 3. A similar situation can be seen at the interface between coating 3 and release film 4, i.e. the formation of trenches or indentations 8. FIG. 3 thus shows a construction 30, consisting of a press plate 6, a release film 4, a coating 3 and a substrate 1. This FIG. 3 shows thus the result of the above mentioned step 4.

Figure 4:
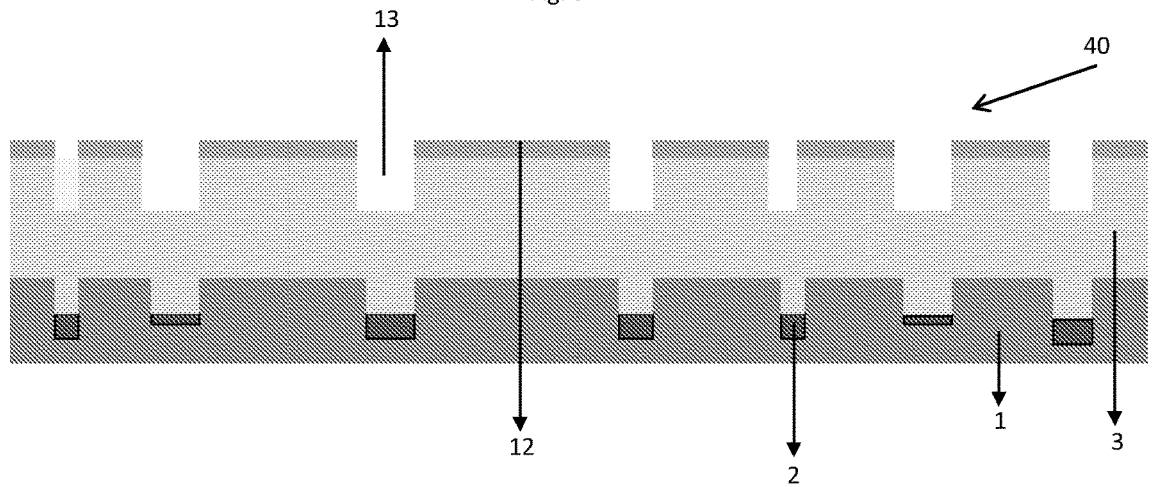

According to FIG. 4 both the release film 4 and the press plate 6 as shown in FIG. 3 have been removed from the coating layer 3. The top area 11 (see FIG. 3) of the registered embossed panel 40 has been provided with a coating 12, without touching the valleys 13 of the embossing, thereby creating gloss/matt effects between the already in-register top-valley of the pressed décor. This FIG. 4 shows thus the result of the above mentioned steps 5 and 6.

In the above shown schematic FIGS. 3 and 4 the indentations made during the press-cycle are presented as if they are transferred 100% throughout the layers. In practise however, the further down you go, the less of the indent is actually pressed into that layer. The present inventors assume that smaller indents might even not reach further down than the coating layer at all. This effect is however by no means in conflict with the present invention. The present inventors assume that one has to take into account the loss of indentation throughout the layers and compensate with amount of printed embossing resin as needed.

EXAMPLE 1

A décor paper is printed with a specific design with a rotogravure process. Next to the design, there are also register marks printed on the edge of the décor paper. As a next step this printed décor paper is impregnated with a radiation curable (meth)acrylic resin, for example a urethane acrylate with a resin content between 20 and 60%. This printed and impregnated décor paper is then coated with a radiation curable (meth)acrylic resin, for example a urethane acrylate. After removing all volatiles, if any, from the impregnation and coating process, the printed substrate paper with the still liquid coating layer on top is laminated with a release paper, where the release layer of the release paper is facing the wet coating. This composite is cured with radiation, for example with electron beams, to cure the radiation curable resins of the impregnation and coating step. A laminate 10 as shown in FIG. 1 is obtained. It is preferred that the width of the release paper is smaller than the width of the printed décor paper, leaving the printed register marks uncovered.

As a next and separate step the printed and coated substrate paper with the release paper on top of the now cured coating, is printed with the structure giving layer, most preferably digitally with radiation curable resins, for example UV-curing. By scanning the register marks on the edge of the laminate with the specific design, it is now possible to print in register with the design beneath. Depending on the depth of the embossing necessary on each individual spot of the coated substrate, the thickness of the in register print is adapted. The deeper the desired embossing, the thicker the print needs to be. This can be reached by multiple passes or multi head single pass, with in-between radiation curing of each resin deposit (per head or per pass). Infinite variations up to 500 µm over width and length are possible. The resulting composite is shown in FIG. 2. Before entering the press cycle the in register print is cured.

As a next and separate step the composite as shown in FIG. 2 is put in a press, single or multi daylight, continuous or discontinuous, subjected to heat from 100 to 250° C. at a pressure of 15 to 100 kg/cm$^2$ for 10 seconds up to 1 hour. These variations in the main parameters for the press-cycle depend on the specific press-type used and type and reactivity of the resins, mostly poly-condensation resins like urea-, melamine- or phenol-formaldehyde. The specific built-up of the core (not shown here) depends on the final product, but has no influence on registered embossing of the present invention. During the press-cycle, the cured coating layer on top of the printed substrate is permanently deformed by impressing the printed structures through the release paper onto the coating layer, as shown in FIG. 3. After the press-cycle the release paper with the structure print now pressed into, is removed from the registered embossed laminate or panel (see FIG. 4).

EXAMPLE 2

The same starting materials and steps as discussed in Example 1 were used, except for the release paper. The release paper was replaced by a transparent release film, for example a PET-film, especially for press-cycles with no cooling back cycle. The transparency of the film enables the scanning of the complete design, not just register marks on the edge. This means that all designs can be random, not specific to be able to apply the print in register.

EXAMPLE 3

The same starting materials and steps as discussed in Example 1 were used, except for the step of curing the coating layer on top of the printed substrate. According to this step of curing the coating layer is not brought to its final curing state when the laminate of FIG. 1 is produced. The coating layer is merely solidified to a pre-cured state, making it still overcoatable with other coating resins after the press-cycle.

After removal of the printed release film, the now registered embossed panel has over its surface a coating layer with uniform gloss-level. It is however much more appealing and in some embodiments preferred that the specific top an valleys, which are in register with the underlying print, also have a difference in gloss-level. The present inventors found that this can be achieved by over-coating the tops with a coating, for example a radiation curable coating to achieve chemical bond, having a different gloss-level from the coating already present on the laminate or panel. This is shown in FIG. 4. Coating technologies like roll-coating with rubber rollers or the like can be applied to achieve just the like on other substrates like wood or veneer panels.

The invention claimed is:

1. A method for manufacturing a registered embossed decorative panel, comprising the steps of:
   producing a composite, comprising the steps of:
      providing a substrate having a printed design on a surface of the substrate;
      applying a coating on the surface of the substrate, the coating covering the printed design;
      applying a release foil on the applied coating;
      curing the applied coating to maintain a position of the release foil on the surface of the substrate; and
      printing a resin on the maintained, positioned release foil, the resin printed in register with the printed design;
   consolidating the produced composite under heat and pressure; and
   removing the maintained, positioned release foil from the consolidated, produced composite to provide a registered embossed decorative panel.

2. The method according to claim 1, wherein the coating is pre-cured.

3. The method according to claim 1, further comprising the step of:
   coating predetermined areas of an outer surface of the registered embossed decorative panel.

4. The method according to claim 3, wherein the predetermined areas comprise top areas of the outer surface.

5. The method according to claim 1, wherein the substrate having the printed design and the maintained, positioned release foil and maintained in alignment during each of the steps including printing the resin on the maintained, positioned release foil and consolidating the produced composite under heat and pressure.

6. The method according to claim 1, wherein the release foil is transparent.

7. The method according to claim 1, further comprising the step of curing the printed resin by one or more of radiation, heat, and chemical additives.

8. The method according to claim 1, wherein the resin is printed on the maintained, positioned release foil by a digital printing process.

9. The method according to claim 1, wherein the step of consolidating the produced composite under heat and pressure comprises simultaneous application of a temperature from 100° C. to 250° C. at a pressure from 15 kg/cm$^2$ to 100 kg/cm$^2$ for 10 seconds up to 1 hour.

10. The method according to claim 1, further comprising the step of scanning the printed design and storing the scanned, printed design as a digital file, wherein the digital file is used to print the resin on the maintained, positioned release foil.

* * * * *